US012220929B2

(12) United States Patent
Di Virgilio et al.

(10) Patent No.: US 12,220,929 B2
(45) Date of Patent: Feb. 11, 2025

(54) PRINT CARRIAGE HEIGHT ADJUSTMENT

(71) Applicant: Hewlett-Packard Development Company, L.P., Spring, TX (US)

(72) Inventors: Vito Di Virgilio, Sant Cugat del Valles (ES); Joseba Ormaechea Saracibar, Sant Cugat del Valles (ES); Andres Cano De La Fuente, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 100 days.

(21) Appl. No.: 17/997,259

(22) PCT Filed: Apr. 28, 2020

(86) PCT No.: PCT/US2020/030216
§ 371 (c)(1),
(2) Date: Oct. 27, 2022

(87) PCT Pub. No.: WO2021/221610
PCT Pub. Date: Nov. 4, 2021

(65) Prior Publication Data
US 2023/0166544 A1 Jun. 1, 2023

(51) Int. Cl.
*B41J 25/304* (2006.01)

(52) U.S. Cl.
CPC .................................. *B41J 25/304* (2013.01)

(58) Field of Classification Search
None
See application file for complete search history.

(56) References Cited

U.S. PATENT DOCUMENTS

| | | | | |
|---|---|---|---|---|
| 4,775,869 | A | 10/1988 | Minowa | |
| 6,394,568 | B1 | 5/2002 | Menendez | |
| 6,461,064 | B1 | 10/2002 | Leonard et al. | |
| 6,663,302 | B2 | 12/2003 | Kelley et al. | |
| 6,736,557 | B2 | 5/2004 | Devore et al. | |
| 6,789,876 | B2 | 9/2004 | Barclay et al. | |
| 7,101,005 | B2 * | 9/2006 | Buonerba | B41J 25/3088 400/59 |
| 7,837,401 | B2 | 11/2010 | Sugiura | |
| 10,464,357 | B2 * | 11/2019 | Saiga | B41J 25/3082 |
| 2013/0257987 | A1 * | 10/2013 | Wakakusa | B41J 19/20 347/39 |
| 2017/0057261 | A1 | 3/2017 | Ehara | |
| 2018/0022125 | A1 | 1/2018 | Vestjens et al. | |

FOREIGN PATENT DOCUMENTS

| | | | |
|---|---|---|---|
| DE | 102016114778 | A1 | 3/2017 |
| RU | 2424386 | C2 | 7/2011 |

* cited by examiner

*Primary Examiner* — Alejandro Valencia
(74) *Attorney, Agent, or Firm* — Jordan IP Law, LLC

(57) ABSTRACT

A height adjustment apparatus for a print carriage comprises a support for supporting the print carriage and a moving mechanism. The support has an upper support surface configured to slidingly engage a surface of the print carriage. The height of the support surface in a first direction increases in a second direction, perpendicular to the first direction. The moving mechanism is configured to move the support in the second direction, wherein when the support is moved in the second direction, the print carriage surface is configured to slide relative to the support surface to move the print carriage in the first direction.

8 Claims, 6 Drawing Sheets

PRINT CARRIAGE HEIGHT ADJUSTMENT

BACKGROUND

In a conventional printer, a print carriage supports a printhead above a platen upon which the print media advances. The print carriage moves laterally along a steel rod in a printing path in order to apply printing agent to the print media.

In large format printing, print media can have diverse thicknesses. To accommodate for the different thicknesses of print media, it may be desirable for the spacing between the printhead and the platen to be adjustable. A conventional approach is to adjust the height of the carriage, to adjust the space between the printhead and the platen in order to accommodate an increases thickness of print media.

DETAILED DESCRIPTION

Figure 1:
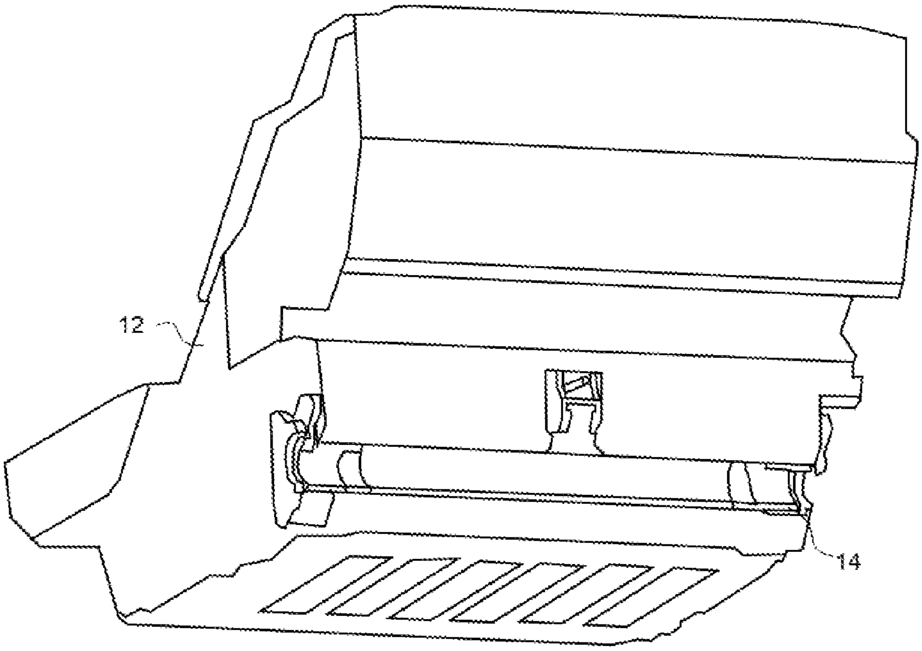
FIG. 1 is a perspective view of a print carriage and height adjustment apparatus.
Figure 2:
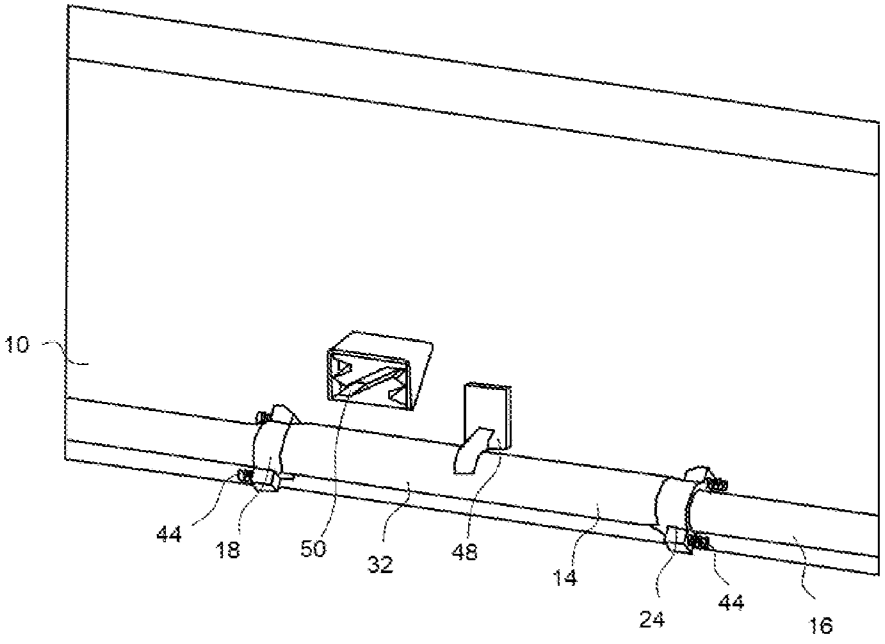
FIG. 2 is a perspective view of the height adjustment apparatus and a part of the printer body.

A printing system comprises a printer body 10, a print carriage 12 and a height adjustment apparatus 14. The print carriage 12 may be mounted on the height adjustment apparatus 14, as shown in FIG. 1 so that the height adjustment apparatus supports the print carriage 12 in use. The printer body 10 may comprise a platen over which print media advances and a rod 16, shown in FIG. 2, along which the print carriage 12 slides in use. FIG. 2 show a portion of the printing system with the print carriage 12 removed. As shown in FIG. 2, the height adjustment apparatus 14 can be mounted to the rod 16 and the height adjustment apparatus 14 may be configured to slide along the rod 16. The print carriage 12 may comprise a printhead and the print carriage 12 and height adjustment apparatus 14 may be configured to slide along the rod 16 in an axial direction in order to move the printhead over media that advances on the platen. The height adjustment apparatus 14 may be configured to adjust the height of the print carriage 12 relative to platen by moving the height of the print carriage relative 12 to the rod 16.

Figure 3A:
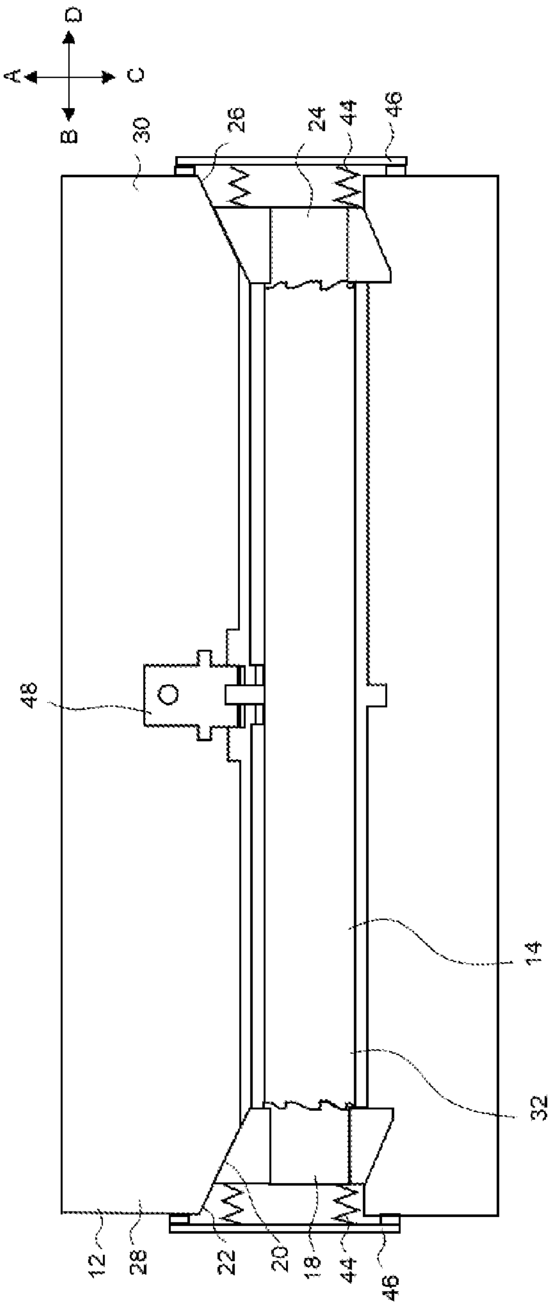
FIG. 3*a* is a schematic view of the print carriage and height adjustment apparatus, wherein the print carriage is provided at a first height.
Figure 3B:
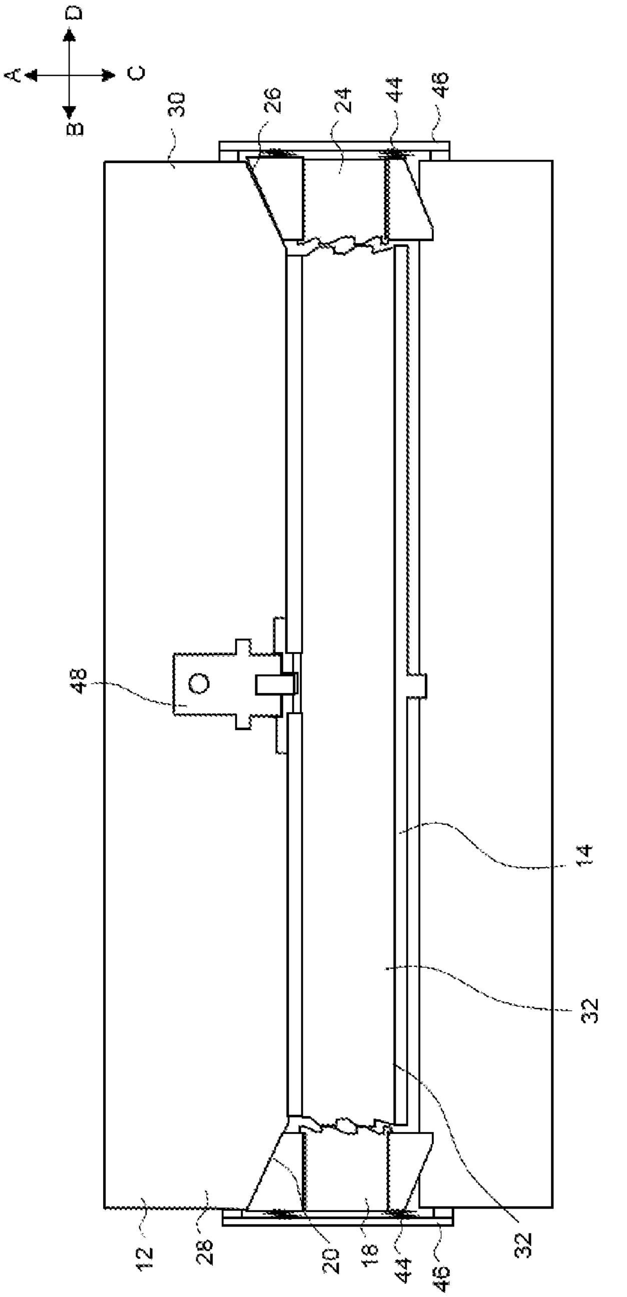
FIG. 3*b* is a schematic view of the print carriage and height adjustment apparatus when the print carriage is provided at a second height.

As shown in FIGS. 3*a* and 3*b*, the height adjustment apparatus 14 for the print carriage 12 comprises a first support 18 for supporting the print carriage 12 and a moving mechanism configured to move the first support 18.

The first support 18 comprises a first support surface 20 configured to slidingly engage a corresponding surface 22 of the print carriage 12. The height of the first support surface 20 in a first direction A increases in a second direction B. For example, the first support surface 20 may be a sloped surface as shown in FIGS. 3*a* and 3*b*. The second direction B may be parallel to the axial direction of movement of the print carriage along the rod. The first direction A may be perpendicular to the second direction. Adjusting the height of the print carriage 12 may comprise moving the print carriage up in the first direction A or down, in a third direction C, opposite to the first direction A.

The moving mechanism is configured to move the first support 18 in the second direction B. When the first support 18 is moved in the second direction B, the print carriage surface 22 is configured to slide relative to the first support surface 20 to move the print carriage 12 down in the third direction C. When the first support 18 is moved in a fourth direction D, opposite to the second direction B, the print carriage 12 may be configured to slide relative to the first support surface 20 to move the print carriage 12 up in the first direction A. This may provide a simplified apparatus for adjusting height of a print carriage.

The height adjustment 14 apparatus may comprise a second support 24. The second support 24 may comprise a second support surface 26. The height of the second support surface 24 may increase in the fourth direction D and the first and second supports 18, 24 may be separated in the second direction. The first support 18 may be configured to support a first end 28 of the print carriage 12 and the second support 24 may be configured to support a second end 30 of the print carriage 12.

The moving mechanism may be configured to move the second support 24 in the second direction B and the fourth direction D, so that the first and second supports 18, 24 move away from each other or towards each other. Adjusting the distance between the first and second supports 18, 24 may cause the print carriage 12 to slide along the support surfaces 22, 26 in the first and third directions A, C, thereby adjusting the height of the print carriage 12. Moving the first and second supports 18, 24 towards each other may cause the carriage 12 to move upwards as shown in FIG. 3*a*, and moving the first and second supports 18, 24 away from each other may cause the carriage 12 to move downwards, as shown in FIG. 3*b*.

The moving mechanism may comprise a cam 32. The cam 32 may be substantially tubular and may be mountable to the rod 16 as shown in FIG. 2, such that in use, the cam is coaxially provided around the rod 16. The cam 32 may be rotatable about the rod 16. Rotation of the cam 32 may cause the first support 18 and second support 24 to move in the second direction B and fourth direction D.

Figure 4B:
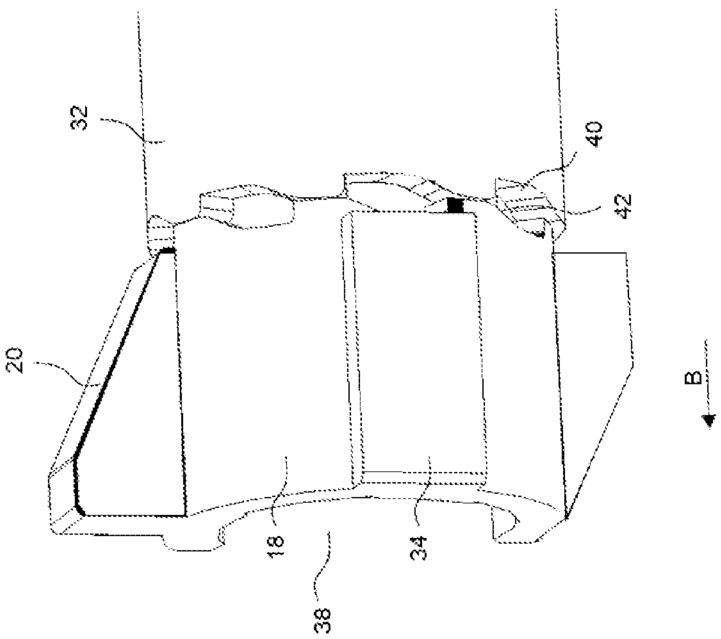
FIG. 4*b* is an enlarged view of the part of the height adjustment apparatus when the print carriage is provided at the second height.
Figure 4A:
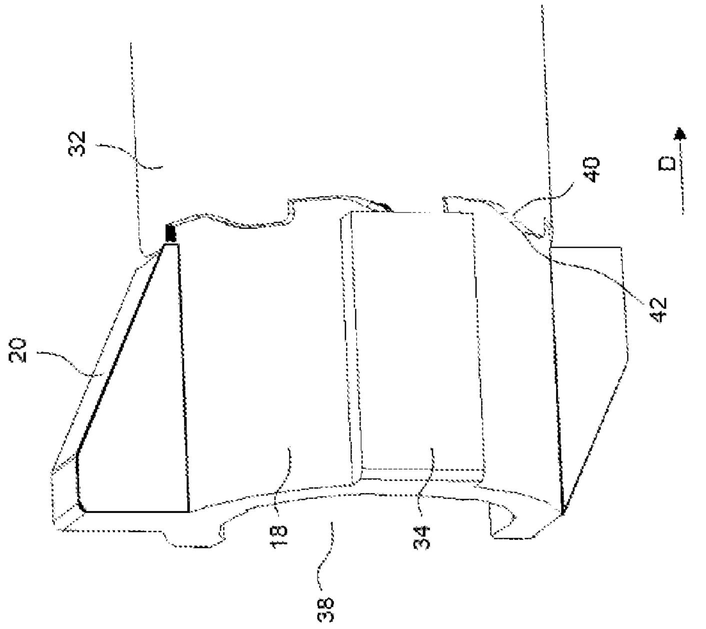
FIG. 4*a* is an enlarged view of a part of the height adjustment apparatus when the print carriage is provided at the first height.

The first and second supports 18, 24 may be bushings and may be provided at either axial end of the cam 32, as shown in FIGS. 4*a* and 4*b*. The bushings may be mountable to the rod 16, such that in use, the bushings are coaxially provided around the rod 16. The bushings may not be rotatable relative to the rod. For example, the bushings may comprise a planar surface 34, as shown in FIGS. 4*a* and 4*b*, which may sit against a planar surface of the carriage, thereby preventing rotation of the bushing about the rod.

Figure 5B:
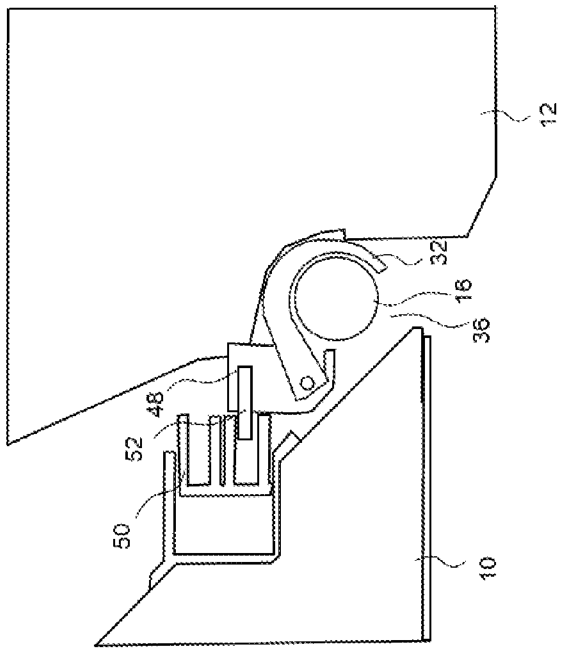
FIG. 5*b* is a second view of the printing system when the print carriage is provided at the second height.
Figure 5A:
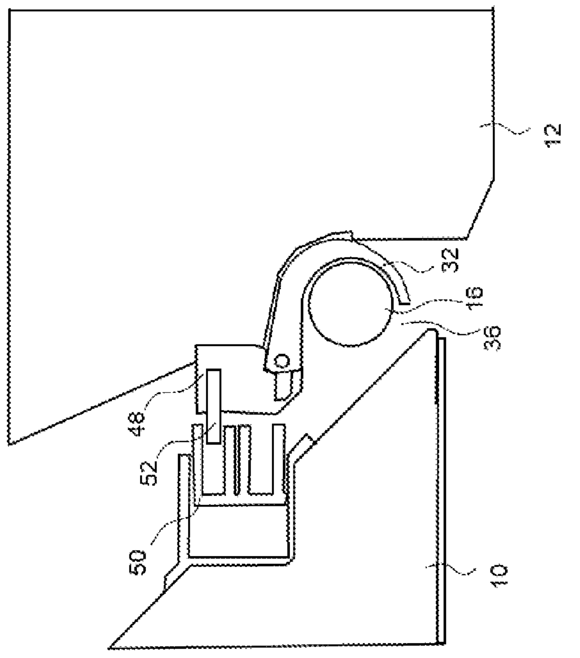
FIG. 5*a* is a section view of a printing system comprising the print carriage, the height adjustment apparatus and the printer body, when the print carriage is provided at the first height.

As shown in FIGS. 5*a* and 5*b*, the cam 32 may comprise an open region 36 along its longitudinal length, such that the cam may be removably mounted to the rod. Similarly, as shown in FIGS. 4*a* and 4*b*, the bushings may comprise an open region 38 along their longitudinal length, such that the bushings may be removably mounted to the rod with the cam 32.

As shown in more detail in FIGS. 4*a* and 4*b*, the first end of the cam 32 may comprise an engagement surface 40, which may be configured to engage a corresponding engagement surface 42 of the support. The cam engagement surface 40 may be provided at the axial end of the cam 32 and may be configured to face the engagement surface 42 of the support 18. The second end of the cam 32 may also comprise an engagement surface, which may be configured to engage a corresponding engagement surface of the second support 24.

The cam engagement surface 40 may comprise a toothed structure. The support engagement surface 42 may comprise a correspondingly toothed structure. When the cam 32 is provided in a first rotational position, shown in FIG. 4*a*, the cam 32 may be coupled to the support 18 by the seating of the toothed structures of the cam engagement surface 40 and the support engagement surface 42. When the cam 32 is rotated in a first rotational direction to a second rotational position, shown in FIG. 4*b*, the cam 32 may be configured to uncouple from the support 18 by separating the toothed structures of the first cam engagement surface 40 and the support surface. The separating of the toothed structures may cause the toothed structure of the first cam engagement surface 40 to push against the toothed structure of the support engagement surface 42, thereby pushing the support 18 in the second direction B.

When the cam 32 is rotated in an opposite rotational direction to the first rotational position, the cam may 32 be configured to recouple to the support 18. The support 18 may be biased in the fourth direction D towards the cam 32, such when the cam 32 is rotated to the first rotational position, the support engagement surface 42 is biased towards the cam engagement surface 40 of the cam 32 and the support 18 recouples to the cam 32.

In an example, the height adjustment apparatus 14 may comprise one or more springs 44 configured to bias the supports 18, 24 towards the cam 32, as shown in FIGS. 3*a* and 3*b*. The one or more springs 44 may be mounted between an end of the supports 18, 24 and plates 46 attached to the carriage that are provided around the rod 16 and spaced apart from the axial end of the supports 18, 24. The one or more springs 44 may push against the axial end of the supports 18, 24 to push the supports towards the cam 32.

The cam 32 may be pivotably connected to a follower 48. The follower 48 may be configured to move up and down in the first and third directions A, C. Movement of the follower 48 in the first direction and third directions A, C may cause the cam 32 to rotate between the first rotational position and the second rotational position, as shown in FIGS. 5*a* and 5*b*.

As shown in FIG. 5*a*, when the follower 48 is moved to an upper position, the cam 32 may be rotated to the first rotation position, wherein the cam 32 couples to the supports 18, 24. The print carriage 12 may thereby be provided at a first height above the platen.

When the follower 48 is moved to a lower position, as shown in FIG. 5*b*, the cam 32 may be rotated to the second rotation position, wherein the supports 18, 24 uncouple from the cam 32. The print carriage 12 may thereby be provided at a second height above the platen, wherein the first height is greater than the second height.

Figure 6:
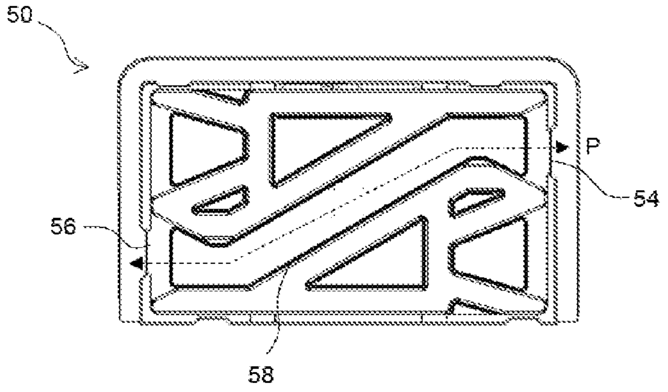
FIG. 6 is an enlarged view of a part of the height adjustment apparatus.

The height adjustment apparatus 14 may be configured to facilitate the adjustment of the height of the follower 48, in order to adjust the height of the print carriage 12. The height adjustment apparatus may be configured to adjust the height of the print carriage 12 to be used at discrete heights, for example to adjust the height of the print carriage 12 between two different heights. The height adjustment apparatus may be configured to adjust the height of the carriage by less than 1 mm, for example 0.2-0.5 mm and preferably by 0.3 mm The printing system may comprise a maze 50 for adjusting the height of the follower 48, as shown in FIGS. 5 and 6. The maze 50 may be fixed to the printer body 10. The maze 50 may be configured to receive a pin 52 of the follower 48.

In an example, the maze 50 provides a path P for moving the follower between upper and lower positions. The maze 50 may comprise an upper opening 54 and a lower opening 58, and the path 58 may connect the upper and lower openings. The lower opening 56 may be on a first side of the maze 50 and the upper opening 54 may be on a second side of the maze 50 in the second direction B and a ramp 58 between the upper and lower openings may form the path. When the follower 48 is in the upper position and the carriage 12 moves in the second direction B, the pin 52 may enter the maze at an upper opening 54. As the carriage continues to move in the second direction B, the pin 52 may follow the path down towards the lower opening 56. The pin may leave the maze by the lower opening 56, and so the follower may then be provided at the lower position.

Similarly, when the follower 48 is in the lower position, and the pin 52 enters the maze 50 at the lower opening 56, movement of the carriage 12 in the fourth direction D may cause the pin 52 to move along the path P towards the upper opening 54. The pin 52 may leave the maze by the upper opening 54 and so the follower 48 may then be provided at the upper position.

The follower 48 is pivotably attached to the cam 32, which forms part of the height adjustment apparatus 14 that supports the printer carriage 12. Movement of the printer carriage in the axial direction of the rod may cause the follower to move left or right in the maze. Movement of the carriage 12 along the rod 16 may therefore cause the adjustment of the height of the carriage, and a further motorized part to adjust the height of the carriage is not required.

The maze 50 may be movable between an active position and a passive position. The printing system may comprise a controller configured to move the maze towards or away from the carriage to move the maze between the active and passive positions.

Figure 7:
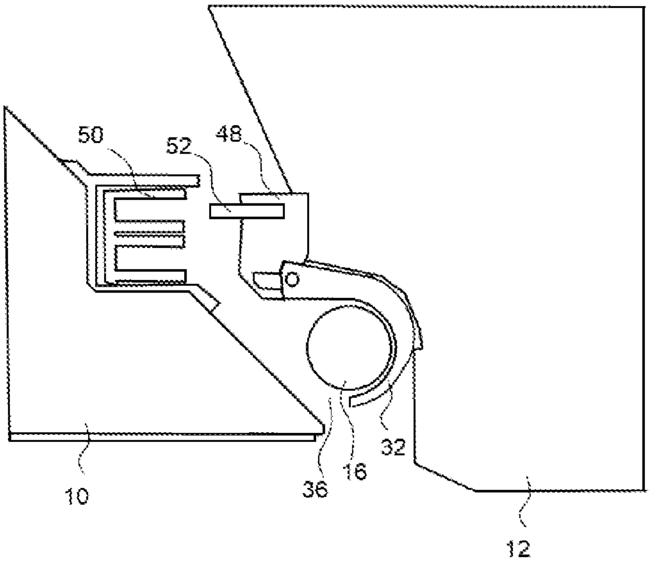
FIG. 7 is a section view of the printing system with the maze in a passive position.

In the active position, as shown in FIGS. 5*a* and 5*b*, movement of the carriage 12 towards the maze 50 in the second or fourth directions may cause the pin 52 to engage an opening 54, 56 in the maze. In the passive position, as shown in FIG. 7, the maze 50 may be retracted away from the carriage 12 into the printer body 10, so that when the follower moves in the second or fourth directions, the follower 48 moves over the maze 50 without the pin 52 entering the maze 50. The controller may be configured to move the maze 50 into the active position when it is desired to change the height of the carriage 12. When the height of the carriage 12 is adjusted, the controller may then move the maze 50 into the passive position, so that movement of the carriage 12 along the rod 16 does not cause the pin 48 to enter the maze.

An example method of adjusting a height of a print carriage relative to a print surface comprises moving a follower in a maze between a first position and a second position, wherein a height of the second position in a first direction is greater than the height of the first position, wherein the follower is pivotably coupled to a cam and wherein movement of the follower between the first height position and the second height position causes rotation of a cam. Rotating the cam causes movement of a print carriage support in a second direction perpendicular to the first direction, and wherein movement of the support in the second direction causes movement of the print carriage in a first direction, thereby adjusting the height of the carriage. The method may comprise moving the maze from a passive position to an active position, to allow the follower to enter the maze.

Examples described herein may provide a simplified apparatus for adjusting a height of a print carriage, because the apparatus utilises the mechanical movement of supports and does not require motors, gears or specific software for adjusting the height. The adjustment of the height is caused by the movement of the carriage and adjustment apparatus along the rod, and therefore utilises the same motorised movement as in a printing operation wherein the print carriage is moved along the rod. The apparatus may have high repeatability, because it does not rely on additional motors for adjusting the height, but instead uses mechanical movement of supports based on a rotation of a cam.

If a print carriage is formed of two pieces, wherein one piece, for example a sub-carriage holding the print head, moves relative to a second piece, then the carriage could experience instability, which can affect performance. Such a carriage could also be expensive to manufacture, and time-consuming and expensive to repair or service. Examples described herein may provide means for adjusting a height of a carriage which may not depend on the shape of the carriage and wherein the carriage may be formed of one piece and may be moved relative to the printer body by the height adjustment apparatus. This may improve the performance and stability of the height adjustment. Examples described herein may provide a height adjustment apparatus that is low-cost and easy to repair or service.

In an example, the maze and follower may be removed to provide a printing system in which the carriage remains at only one height, but which implements the remaining components of the height adjustment apparatus to allow the printing system to be removably mounted to the printer body. This may improve manufacturing processes, because the printer body, print carriage and most of the height adjustment apparatus components can be used in manufacturing printing systems in which height may be adjusted, and printing systems in which height is not adjusted.

The invention claimed is:

1. A height adjustment apparatus for a print carriage comprising a support for supporting the print carriage on a rod, the support having a support surface configured to slidingly engage a surface of the print carriage, wherein a height of the support surface in a first direction increases in a second direction, perpendicular to the first direction, a moving mechanism configured to rotate around the rod to move the support in the second direction, wherein when the support is moved in the second direction, the print carriage surface is configured to slide relative to the support surface to move the print carriage in the first direction.

2. The height adjustment apparatus according to claim 1, wherein the support is a first support and wherein the height adjustment apparatus further comprises a second support, wherein a height of a support surface of the second support increases in a direction opposite to the second direction, the first support and the second support being separated in the second direction, wherein the first support is configured to support a first end of the print carriage and the second support is configured to support a second end of the print carriage.

3. The height adjustment apparatus according to claim 2, wherein the moving mechanism is configured to move the second support in a direction opposite to the second direction, and wherein adjusting a distance between the first and second supports causes the print carriage to slide along the first support surface and the second support surface to adjust the height of the print carriage.

4. The height adjustment apparatus according to claim 1, wherein the moving mechanism comprises a cam, wherein rotation of the cam causes the support to move in the second direction.

5. The height adjustment mechanism according to claim 4, wherein the moving mechanism further comprises a follower pivotably coupled to the cam, and wherein movement of the follower in the first direction causes the cam to rotate.

6. The height adjustment mechanism according to claim 5, wherein the follower comprises a pin that is movable within a maze portion between a first position and a second position, wherein movement of the pin between the first position and the second position causes the follower to move in the first direction.

7. The height adjustment apparatus according to claim 4, wherein the support comprises a bushing provided at a longitudinal end of the cam, the bushing and the cam comprising complementary engagement surfaces, wherein rotation of the cam in one of an clockwise or counter-clockwise direction causes a separation of the bushing engagement surface from the cam engagement surface, thereby pushing the bushing in the second direction away from the cam.

8. The height adjustment apparatus according to claim 7, wherein the bushing is biased in a direction opposite to the first direction, and wherein rotation of the cam in the other of the clockwise or counter-clockwise direction causes the bushing engagement surface to engage the cam engagement surface by biasing the bushing towards the cam.

* * * * *